United States Patent [19]

Multack

[11] 4,361,016
[45] Nov. 30, 1982

[54] APPARATUS FOR GLAZING FROZEN FOODS

[76] Inventor: Leslie Multack, 3811 Brett La., Glenview, Ill. 60025

[21] Appl. No.: 230,453

[22] Filed: Feb. 2, 1981

[51] Int. Cl.³ ............................................. F25D 17/02
[52] U.S. Cl. .................................. 62/374; 198/952; 426/524
[58] Field of Search ................... 62/63, 64, 374, 375; 426/524; 198/952

[56] References Cited

U.S. PATENT DOCUMENTS

| | | | |
|---|---|---|---|
| 1,530,108 | 3/1925 | Collins | 62/375 |
| 1,783,345 | 12/1930 | Roesen | 62/374 |
| 1,907,649 | 5/1933 | Marx | 62/374 |
| 2,102,506 | 12/1937 | Bland | 62/63 |
| 2,723,645 | 11/1955 | Garapolo | 62/63 |
| 2,802,341 | 8/1957 | Polk | 62/63 |
| 3,004,407 | 10/1961 | Morris, Jr. | 62/374 |
| 3,101,757 | 8/1963 | Hanson | 62/374 |

*Primary Examiner*—Ronald C. Capossela
*Attorney, Agent, or Firm*—Irwin C. Alter

[57] ABSTRACT

Apparatus and method for depositing a uniform protective coating of ice on frozen food products. A conveyor has a belt with individual flights defining a path through a cold water bath with the food articles to be frozen positioned on individual flights. Apparatus is provided to separate food articles within each flight to prevent the articles from freezing together. Apparatus is also provided to prevent the articles from floating from flight to flight while passing through the bath.

4 Claims, 5 Drawing Figures

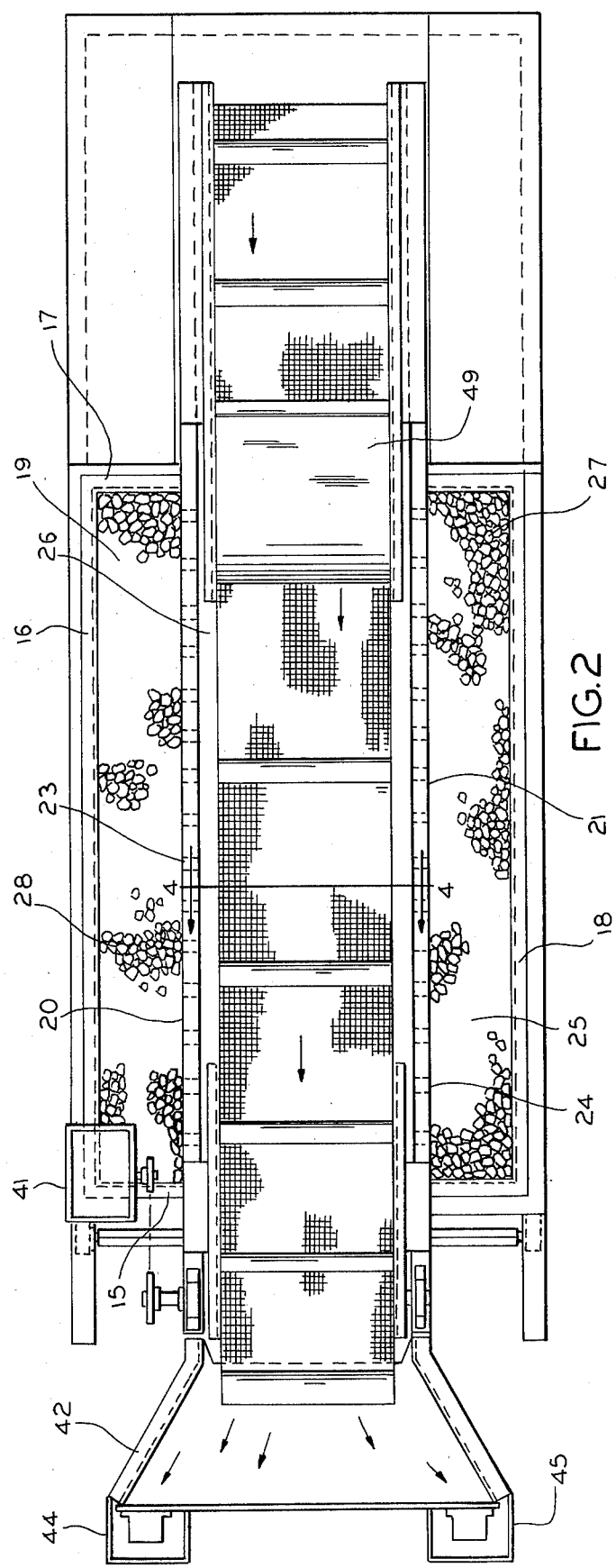
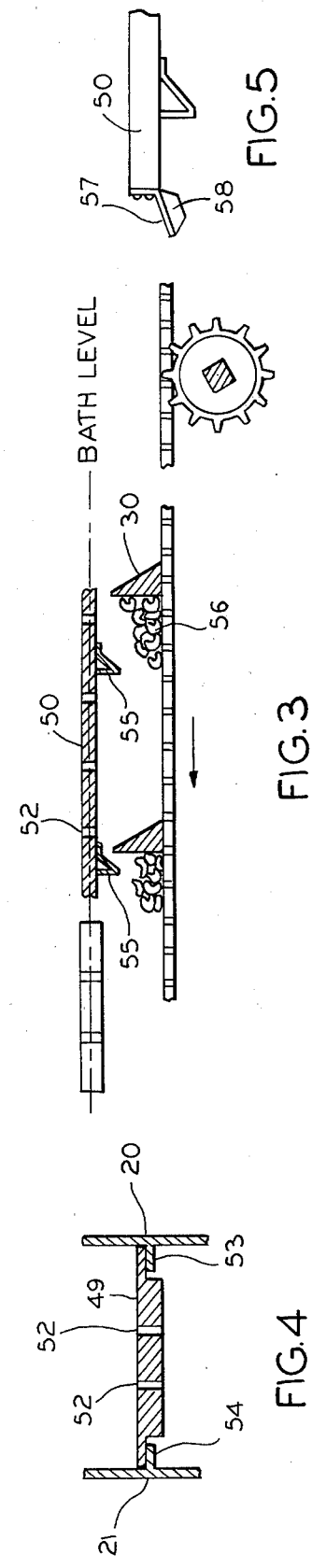

APPARATUS FOR GLAZING FROZEN FOODS

The present invention relates generally to apparatus used in conjunction with processing frozen food articles, and more particularly, to apparatus for depositing a uniform coating of ice, or "glaze", upon frozen food articles.

Freezing of food items is a large scale and widely practiced technique for the preservation of food in as nearly a fresh state as is possible during the period between harvesting and ultimate preparation for consumption. Techniques have been developed and perfected to freeze fresh food articles in a very short period of time. Such techniques make it possible to preserve as fresh a taste in the frozen articles as would be expected had the article been prepared and consumed from its fresh state.

Certain foods, such as many varieties of sea food, require careful attention during the freezing process because such foods tend to spoil easily thus developing objectionable appearances and flavors. Many techniques are utilized to prevent such occurrences, and include freezing of the articles immediately after they have been caught. Ocean-going fishing vessels, such as those used to fish for tuna, typically have food freezing apparatus on board and the day's catch is processed, frozen and stored until the ship returns to port where it is subsequently unloaded.

It has been found, however, that certain sea foods may suffer during prolonged freezer storage, absent some type of protective covering. It is not uncommon for such foods to develop a condition known as "freezer burn" wherein individual cells of the edible tissue burst or discolor from prolonged contact with the air in an environment of sub-freezing temperatures.

Sea food may also suffer should any partial thawing at subsequent refreezing occur. These are very important considerations when it is realized that preserving and transporting sea food in a fresh state would be prohibitively expensive, inefficient, and ineffective.

The need thus exists for a technique for the treating of already frozen food items to enhance the ability of said items to resist freezer damage during prolonged periods of storage, and to provide apparatus for the convenient and economical performance of such technique.

One such technique that has been successfully used is sometimes called "glazing". Beginning with a frozen article of food, water is applied to the exterior thereof, thereby creating an additional layer of ice to seal off and protect the article during storage and transportation. Means to practice this technique have, however, proven largely ineffectual or uneconomical. Application of an additional layer of water to an already frozen article must be closely controlled to assure that the applied water does not partially thaw the article before subsequent freezing. Control must also be maintained as to the thickness of the glaze applied to each individual food item.

Another problem faced during the practice of glazing is the tendency for small articles, such as shrimp, to freeze together when batches of said articles are glazed.

Accordingly, the present invention has the following objects:

To provide apparatus and methods for the effective glazing of frozen food products;

To provide such apparatus and methods in forms which enable the thickness of glaze to be controlled;

To provide such apparatus and methods in forms which can successfully glaze individual small articles of food;

To provide such apparatus and methods in forms which are simple to operate and maintain and economical to produce; and To provide such apparatus and methods in forms which guard against partial inadvertant thawing of the article sought to be glazed.

These and further objects will become more apparent upon consideration of the accompanying drawings wherein:

FIG. 2 is a top view of the apparatus shown in FIG. 1;

FIG. 3 is a partial sectional view illustrating a portion of the conveyor belt and the covers therefore;

FIG. 4 is a view along 4—4 of FIG. 2; and

FIG. 5 is a partial sectional view of one of the covers shown in FIG. 3.

Figure 1:
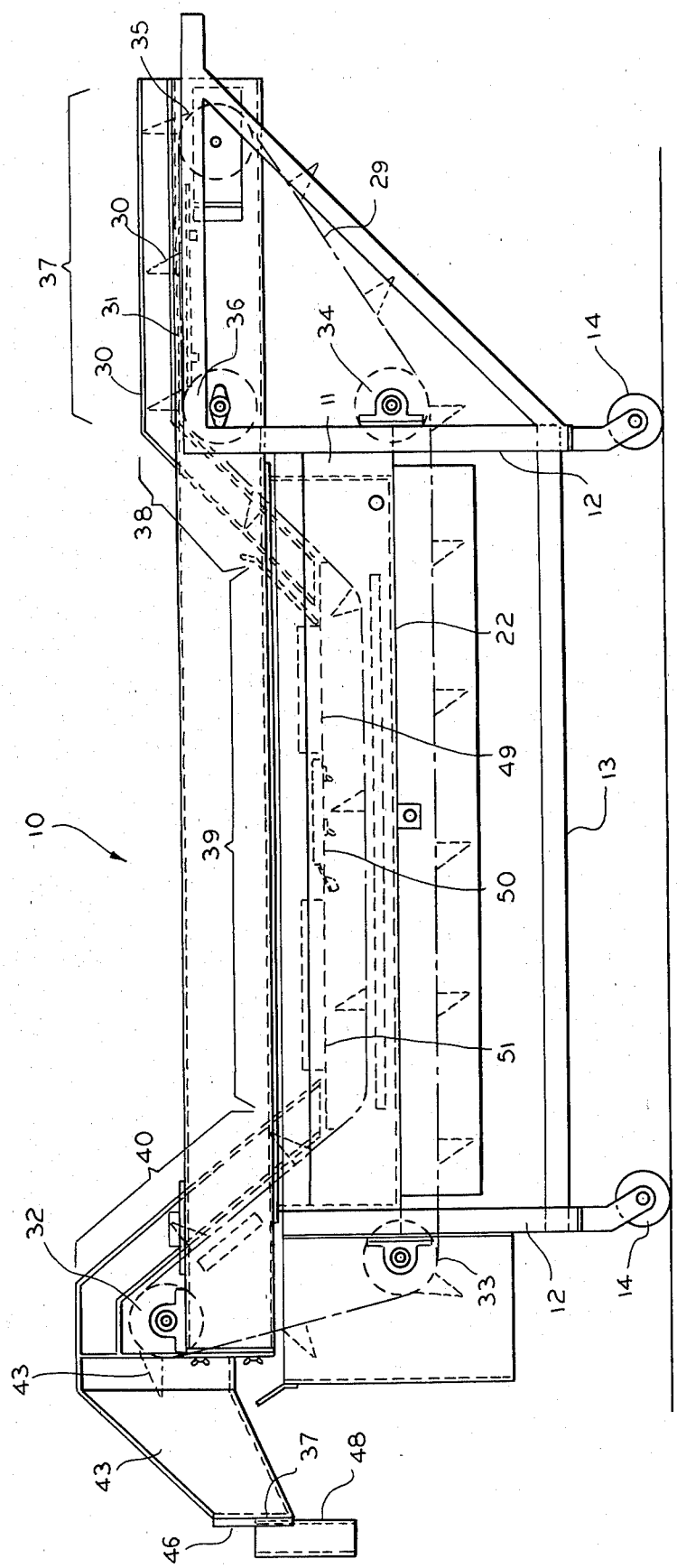
FIG. 1 is a front elevation of a food glazing bath apparatus.

Consistent with the foregoing objects, there is provided apparatus for the maintaining of a glazing bath for frozen food articles. A conveyor belt has a plurality of individually defined flights and includes idler and drive apparatus to guide such flights to enter and exit a bath tank. Means are provided within said bath tank to allow for the presence and circulation of water maintained at a near freezing temperature. Articles placed on an individual flight of said conveyor belt are directed into said bath tank, submerged beneath the water level maintained in said tank for a pre-determinable amount of time, then drawn out of said bath to be collected and packaged. Means are provided to discourage the migration of small food articles from one flight to another by preventing said articles from floating freely in said tank, and means are provided to separate articles contained within a single flight to assure individual glazing.

Referring now to FIG. 1, the numeral 10 indicates generally apparatus for maintaining and utilizing a glazing bath for frozen food articles. As can best be appreciated from FIGS. 1 and 2, glazing apparatus 10 includes a largely rectangular tank 11 supported by depending structural members 12 and transverse structural members 13. Large, heavy-duty wheel assemblies 14 may be provided to make glazing apparatus 10 freely positionable as required. Well-known means are available to either disable, remove, or lock said wheel assembly 14 to prevent unwanted movement, and need not be detailed here.

As best seen in FIG. 2, tank 11 is divided into three sections. Tank 11 is generally defined by front wall 15, right side wall 16, rear wall 17, and left side wall 18. First side tank 19 is formed by the placement of first transverse wall 20 extending from front wall 15 to rear wall 17 and generally parallel to right side wall 16. In like fashion, second partition 21 is provided extending proximate to and parallel to left side wall 18.

Said first partition 20 and second partition 21 extend downward to be fastened to bottom 22 of tank 11, and extend upwardly to nearly the same height as walls 15, 16, 17 and 18.

As seen in FIG. 2, first and second partitions 20 and 21 are provided with a plurality of circular ports 23 and 24 respectively. Said ports are shaped, and positioned, to enable liquid to travel from first side tank 19 and second side tank 25 to bath 26.

As presently contemplated, bath 26 will be filled with water, to be used for glazing. In a preferred embodiment of the present invention, side tanks 19 and 25 may be filled with ice, as illustrated generally at 27 and 28. Ports 23 and 24 allow the circulation of water between tanks 19, 25 and 26 and the provision of ice in tanks 19 and 25 in sufficient quantity will maintain the temperature of bath 26 at or near the freezing point of water.

In the embodiment herein above described, the use of ice has advantages in that the unit may be operated independently of any required refrigeration lines. Should such lines be desirable, they may be provided and positioned within side tanks 19 and 25 to perform the same cooling action as that performed by said ice. Means may also be provided to promote circulation of the bath water, including impellers and the like.

Referring now to FIG. 1, conveyor belt 29 is shown having a plurality of flights defined by steps 30 positioned along belt 29, with a single flight 31 defined by adjacent steps 30.

Belt 31 is directed, by suitable guide means, over drive sprocket 32 and idlers 33, 34, 35 and 36 to follow a path which has a first horizontal segment 37, a depending segment 38, a second horizontal segment 39, ascending segment 40, and a return path extending generally from drive sprocket 32 past idlers 33 and 34 to idler 35.

In a preferred embodiment, belt 29 is manufactured of polymeric plastic conveyor belting such as that manufactured by Interlox, Inc., in an open mesh configuration to allow the contents of bath 26 to flow through said belt 29 when said belt is submerged, and of substantial strength and flexibility when exposed to near-freezing temperatures. Stainless steel belting may also be used.

Drive sprocket 32 is preferably driven by an electric motor 41 having suitable gearing or other speed-regulating controls to allow the rate at which belt 29 travels to be closely controlled and regulated. Such controls are well-known in the art of governing electrical motors and need not be discussed in detail herein.

In the preferred embodiment shown, belt path segment 37 is utilized for loading food articles onto individual flights as such flights are there positioned. Once a selected flight has been loaded, it then travels through belt path segment 38 and thus enters bath 26. Traveling along belt path segment 39, said flight reaches its limit of submerged travel, and when belt path segment 40 is reached, said flight begins its ascent from bath 26. As said flight passes over drive sprocket 32, it undergoes a change of direction sharply enough defined to dump the contents of said flight downward into unloading chute 42.

To facilitate the unloading of each flight steps 30 are formed in a generally right-triangular cross-section, with the hypotenuse forming a ramp as it passes over drive sprocket 32, as shown at 43 of FIG. 1.

As best seen in FIG. 2, unloading chute 42, in a preferred embodiment, provides two unloading stations 44 and 45 wherein product may be quickly packed into containers once it has been processed. One preferred embodiment includes an upstanding front wall 46, as seen in FIG. 1, with an opening 47 formed therethrough communicating with a drop chute 48 beneath which appropriate packaging for the product may be positioned.

It is contemplated that many of the food items selected to be frozen would float if placed in a bath of the type herein described unless suitably restrained. For that purpose, covers 49, 50 and 51 are provided, which may be positioned at or beneath the water level in bath 26. As seen in FIGS. 3 and 4, said covers may be provided with ports 52 to facilitate the placement of said covers by allowing water to flow therethrough. Said ports may be sized to prevent the passage therethrough of products to be processed.

When flight 31 of belt 29 thus passes along belt path segment 39, product is restrained by covers 49, 50 and 51 from floating into bath 26. Steps 30 extend upward, proximate to said covers to prevent product from migrating from flight to flight. In like fashion, partitions 20 and 21, upon which covers 49, 50 and 51 may rest, prevent lateral migration of product. Ports 23 and 24, as pictured in FIG. 2, may be positioned along said partitions beneath the level of belt path segment 39 to eliminate a potential source for such migration.

As seen in FIG. 4, covers such as that typified by cover 49, may be supported along rails 53 and 54 attached, respectively, to partitions 20 and 21, facilitating removal for inspection and cleaning.

When processing small food items normally frozen in batches, such as typified by shrimp, means are required to prevent said food items from freezing together in one solid mass. As seen in FIGS. 3 and 4, stops 55 may be provided, attached to the underside of cover 50, to extend downward a sufficient distance to engage each step 30 as it passes by thus flexing step 30 and transferring a shock to product 56 to separate individual pieces of product to insure uniform glazing. As seen in FIG. 5, a modified version of said stops may be provided with a flexible metal strip 57 to which is attached a resilient bumper 58. Said bumper 58 contacts each step 30 as it passes thereunder, thus separating product retained within the flight.

Polymeric materials are commonly employed in the construction of conveyor belts of this type and will withstand the type of flexing and contact provided by said bumpers.

In use, frozen product is inserted in individual flights 31 as they pass along belt path segment 37. Said flights then travel along belt path segment 38 to immerse said product in bath 26. As said flights travel along belt path segment 39, steps 31 are contacted by bumpers 55 or 57 in order to keep individual items of product separated during the glazing process. Bath 26 is maintained at near-freezing temperatures, with the object being to maintain the bath in a liquid state to assure total coverage of each article of product while hastening the freezing process which occurs when the water in said bath contacts said frozen product. As said flights ascend along belt path segment 40, the open mesh construction of belt 29 enables excess bath water to drain back into tank 26. As said flights reach drive sprocket 32 the direction of travel of belt 29 is altered to dump said product along the following edge of step 30 into discharge chute 42 for subsequent packaging and freezer storage.

The rate at which glaze is deposited on individual product items will vary with the temperature of the items, the size of the items and the configuration of the items. It has been found that the degree to which glaze is deposited upon individual items may be varied and controlled by regulating the speed at which belt 29 travels along the entire belt path. More particularly, by controlling said speed, it is possible to control the length of time during which product is immersed and by holding the bath temperature near constant, uniform glaze production has been achieved. By controlling the migration of product, bath time is further standardized and controlled.

While the foregoing has presented the present invention by way of description of a specific embodiment, it is to be understood that said description has been provided as an example only. It is expected that others skilled in the art will perceive variations which, while differing from the foregoing, remain within the spirit and scope of the invention as herein described and claimed.

I claim:

1. Apparatus for treating frozen articles by immersion in a liquid bath, said apparatus of the type having a conveyor belt following a path entering and exiting said bath, said apparatus comprising:

said belt path having a first generally horizontal segment,
a second generally descending segment descending into said bath,
a third generally horizontal segment in said bath,
a fourth generally ascending segment from said bath;
means formed on said belt to divide said belt into individual flights,
said dividing means including a plurality of upstanding flexible steps;
means to limit the migration of said articles from each said flight;
means to control the temperature of said bath;
means to control the time during which the articles remain in said bath;
means to separate said articles to limit the freezing together of said articles during travel through said bath,
said separating means including means to intermittently flex said belt dividing means during travel of said belt through said bath; and
means to collect said articles after said articles exist from said bath.

2. The apparatus as recited in claim 1 wherein said migration limiting means includes means to cover said bath,
said belt passing beneath said cover means along said third belt path segment.

3. The apparatus as recited in claim 1 wherein said flexing means includes one or more stop members,
said stop members being positioned above said belt to contact said belt dividing means as said dividing means pass by said stop members.

4. The apparatus as recited in claim 3 wherein said covers include at least one stop means,
said stop means being positioned along the underside of said cover means,
said stop means extending downward a sufficient distance to contact and flex said belt dividing means as said belt travels along said third belt path segment.

* * * * *